US012645973B1

(12) United States Patent
Kissell

(10) Patent No.: US 12,645,973 B1
(45) Date of Patent: Jun. 2, 2026

(54) HYBRID COMPUTER ARCHITECTURE WITH MULTIPLE QUANTUM PROCESSING ELEMENTS

(71) Applicant: Google LLC, Mountain View, CA (US)

(72) Inventor: Kevin Douglas Kissell, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 629 days.

(21) Appl. No.: 18/308,538

(22) Filed: Apr. 27, 2023

Related U.S. Application Data

(60) Provisional application No. 63/335,565, filed on Apr. 27, 2022.

(51) Int. Cl.
G06N 10/60 (2022.01)
G06N 10/80 (2022.01)

(52) U.S. Cl.
CPC ............. G06N 10/60 (2022.01); G06N 10/80 (2022.01)

(58) Field of Classification Search
None
See application file for complete search history.

(56) References Cited

U.S. PATENT DOCUMENTS

| | | | | |
|---|---|---|---|---|
| 10,325,218 | B1 * | 6/2019 | Zeng | G06N 10/40 |
| 10,346,508 | B2 * | 7/2019 | Amin | G06F 17/18 |
| 11,055,626 | B2 * | 7/2021 | Babbush | G06F 15/16 |
| 11,169,801 | B2 * | 11/2021 | Cao | G06N 10/70 |
| 11,763,187 | B2 * | 9/2023 | Babbush | G06F 15/16 |
| | | | | 706/12 |
| 11,868,846 | B1 * | 1/2024 | Shields | G06N 7/01 |
| 11,894,860 | B2 * | 2/2024 | McClean | G06N 10/20 |
| 2005/0027458 | A1 * | 2/2005 | Merz, Jr. | G16C 20/50 |
| | | | | 702/19 |
| 2020/0257998 | A1 * | 8/2020 | Troyer | G06F 17/11 |
| 2023/0042150 | A1 * | 2/2023 | Li | G06N 10/60 |
| 2023/0306290 | A1 * | 9/2023 | Hamze | G06N 20/00 |

OTHER PUBLICATIONS

Cerezo et al., "Variational Quantum Algorithms" submitted on Oct. 2021, arXiv:2012.09265v2, 33 pages.

* cited by examiner

*Primary Examiner* — Maikhanh Nguyen
(74) *Attorney, Agent, or Firm* — Fish & Richardson P.C.

(57) ABSTRACT

Methods, systems, and apparatus for variational ansatz exploration. In one aspect, a method includes iteratively, until termination criteria are met: for each of one or more candidate ansatzes: evaluating, by a respective quantum processing unit included in a quantum processor, a cost function using current values of parameters of the candidate ansatz, wherein one or more quantum processing units of the quantum processor evaluate the cost function in parallel, determining, by a classical processor, parameter values of the candidate ansatz that optimize the evaluated cost function and updating the values of the parameters of the candidate ansatz using the determined parameter values; identifying, by the classical processor, optimal updated values of the parameters of the candidate ansatzes and in response to determining that the optimal updated values of the parameters of the candidate ansatz satisfies termination criteria, outputting the optimal updated values as trained variational ansatz parameters.

18 Claims, 7 Drawing Sheets

HYBRID COMPUTER ARCHITECTURE WITH MULTIPLE QUANTUM PROCESSING ELEMENTS

CROSS-REFERENCE TO RELATED APPLICATIONS

This application claims the benefit under 35 U.S.C. § 119 (e) of U.S. Patent Application No. 63/335,565," filed Apr. 27, 2022. The disclosure of the foregoing application is incorporated herein by reference in its entirety for all purposes.

BACKGROUND

This specification relates to hybrid quantum computing.

Classical computers have memories made up of bits, where each bit can represent either a zero or a one. Quantum computers maintain sequences of quantum bits, called qubits, where each quantum bit can represent a zero, one, or any quantum superposition of zero and one. Quantum computers operate by setting qubits in an initial state and controlling the qubits, e.g., according to a sequence of quantum computing operations such as single-qubit gates, entangling gates, and measurement.

Hybrid quantum computing is a set of computational models where both quantum and classical computations are involved in the execution of an algorithm. Variational quantum computing is a hybrid quantum computing model where a quantum program is constructed in such a way that its behavior is governed by a set of parameter values provided to control operations within the program. The parameterized quantum program is called an ansatz. The parameters can be tuned by classical computer optimization algorithms to make the quantum program compute a desired quantum function to a desired level of accuracy.

SUMMARY

This specification describes a hybrid computer architecture with multiple quantum processing elements.

One innovative aspect of the subject matter described in this specification can be implemented in a method for variational ansatz exploration, the method including: iteratively, until termination criteria are met: for each of one or more candidate ansatzes: evaluating, by a respective quantum processing unit included in a quantum processor, a cost function using current values of parameters of the candidate ansatz, wherein one or more quantum processing units of the quantum processor evaluate the cost function in parallel, determining, by a classical processor, parameter values of the candidate ansatz that optimize the evaluated cost function, and updating, by the classical processor, the values of the parameters of the candidate ansatz using the determined parameter values; identifying, by the classical processor and from the updated values of the parameters of the one or more candidate ansatzes, one or more optimal updated values of the parameters of the candidate ansatzes; and determining, by the classical processor, whether the optimal updated values of the parameters of the candidate ansatz satisfies the termination criteria; and in response to determining that the optimal updated values of the parameters of the candidate ansatz satisfies termination criteria, outputting, by the classical processor, the optimal updated values of the parameters of the candidate ansatz as trained variational ansatz parameters.

Other implementations of these aspects include corresponding computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the one or more candidate ansatzes comprise one or more distinct ansatzes.

In some implementations the classical processor comprises multiple classical processing cores, each of the classical processing cores configured to determine parameter values of a candidate ansatz that optimize an evaluated cost function and update the values of the parameters of the candidate ansatz using the determined parameter values, wherein the classical processing cores operate with a level of parallelism that is higher, lower, or equivalent to a level of parallelism at which the quantum processing units operate.

In some implementations a mapping between cost functions evaluated by the quantum processing units and the classical processing cores is dynamic to balance a load of the quantum processor and the classical processor.

In some implementations the method further comprises using the quantum processor and trained variational ansatz parameters to perform a quantum simulation.

In some implementations outputting the optimal updated values of the parameters of the candidate ansatz as trained variational ansatz parameters comprises: providing, by the classical processor, each of the multiple quantum processing units with the trained variational ansatz parameters; performing, in parallel and by each of the multiple quantum processing units, a quantum simulation using the trained variational ansatz parameters; and processing, by the classical processor, results of the performed quantum simulations to obtain a quantum simulation output.

In some implementations the one or more candidate ansatzes comprise a parameterized quantum operation or parameterized quantum circuit.

In some implementations identifying one or more optimal updated values of the parameters of the candidate ansatzes comprises using historical parameter space exploration data to identify suitable parameter sub-spaces.

Another innovative aspect of the subject matter described in this specification can be implemented in a method for performing a Monte Carlo algorithm, the method including: performing, by a classical processor, an initial step of the Monte Carlo algorithm; iteratively, until termination criteria are met: performing, by the classical processor, a subsequent step of the Monte Carlo algorithm, comprising receiving, from a respective quantum processing unit included in a quantum processor comprising multiple quantum processing units, a correction for the subsequent step; and determining, by the classical processor, whether an output of the performed subsequent step satisfies the termination criteria; and in response to determining that the output of the performed subsequent step satisfies the termination criteria, providing, by the classical processor, the output of the performed subsequent step as an output for the Monte Carlo algorithm.

Other implementations of these aspects include corresponding computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the multiple quantum processing units comprise a number of quantum processing units that is less than a number of steps of the Monte Carlo algorithm.

In some implementations a mapping between the quantum processing units and the steps of the Monte Carlo algorithm is dynamic to balance a load of the quantum processor and the classical processor.

The subject matter described in this specification can be implemented in particular ways so as to realize one or more of the following advantages.

For variational quantum algorithms, multiple compatible quantum processing units can be employed in parallel, either to generate a statistically meaningful number of bit strings from a given quantum program, or to evaluate multiple possible optimizations of one or more variational ansatzes at the same time. Selecting an appropriate variational ansatz for a given problem is a difficult task that requires deep insight into the physics of the system that is being modelled and an understanding the problem that is being solved. Evaluating multiple possible optimizations of one or more variational ansatzes can enable multiple optimizations of multiple candidate ansatzes to be explored in parallel in order to determine a global optimized variational ansatz that is most appropriate and accurate for the given system and problem. In addition, using parallel algorithms for classical optimization methods, a dynamic balance of N quantum pipelines to M classical cores can be found that optimizes execution time and utilization efficiency, enabling the global optimized variational ansatz to be quickly and efficiently identified.

Further, when a set of candidate ansatzes potentially applicable to a function or system exists, or an automated system generating multiple potential ansatzes is used (e.g., provides candidate ansatzes as input), in addition to opportunistically parallelizing the evaluation and tuning of individual ansatzes, the architecture allows opportunistic parallel evaluation of competing candidate ansatzes. In this case, in addition to global, shared information about the best parameter set and results for a given ansatz, the system maintains and updates data about relative performance between different ansatzes, and can prioritize resources accordingly. A system with N quantum processors can evaluate up to N ansatzes in parallel, or a single ansatz up to N times more quickly.

Further, the hybrid computer architecture described in this specification can be used to improve the execution time and utilization efficiency of other hybrid quantum-classical algorithms, e.g., quantum Monte Carlo algorithms.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

This specification describes a hybrid computer architecture with multiple quantum processing elements. The hybrid computer architecture can be used to perform hybrid algorithms such as variational quantum algorithms or hybrid Monte Carlo algorithms.

Figure 1:
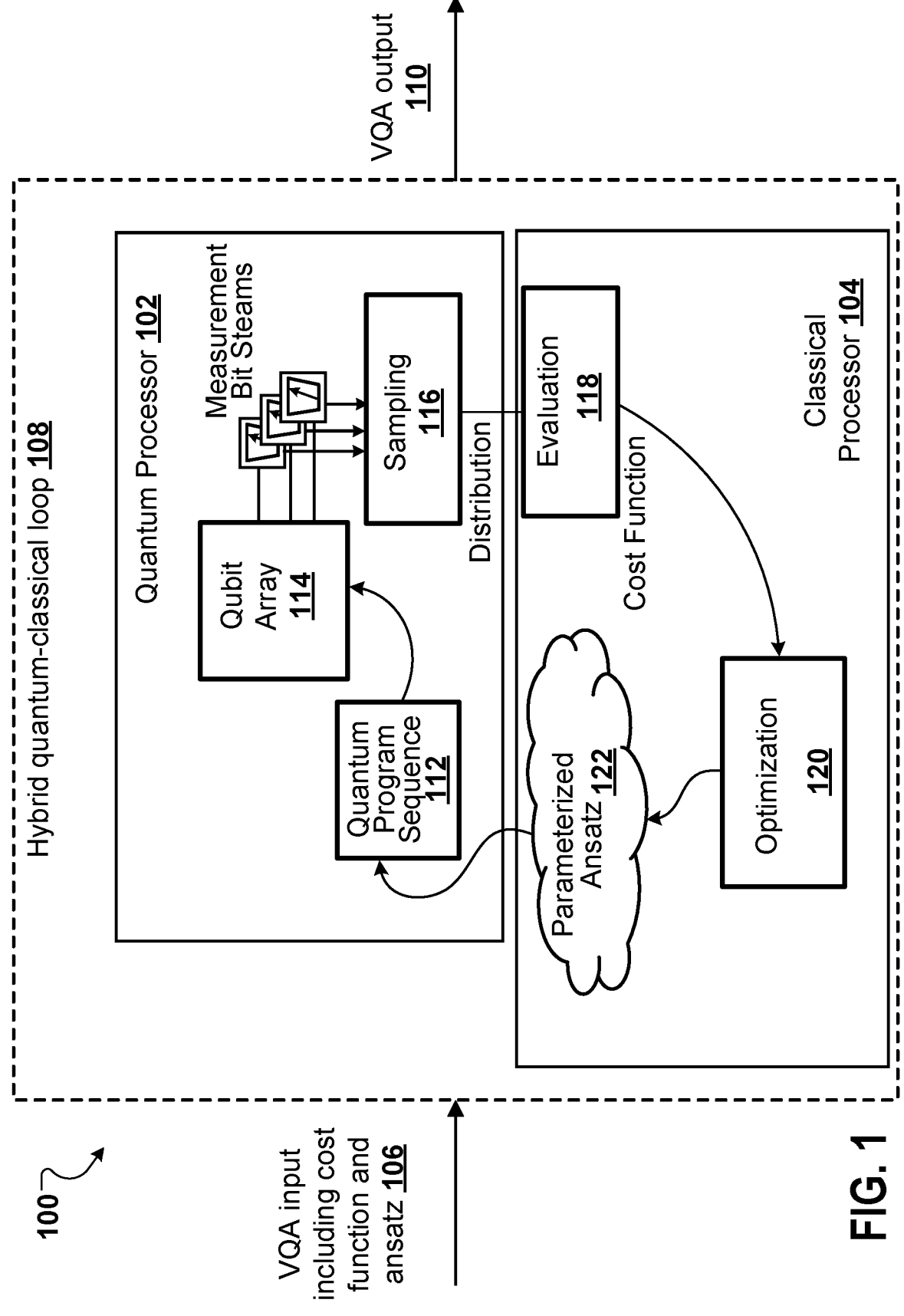
FIG. 1 is a schematic diagram of an example hybrid computer with one quantum processing unit implementing a variational quantum algorithm to solve a computational task.

FIG. 1 is a schematic diagram of an example hybrid computer 100 implementing a variational quantum algorithm (VQA) to solve a computational task. The hybrid computer 100 includes a quantum processor 102 in data communication with a classical processor 104. In this example, the quantum processor 102 includes one quantum processing unit, as described in more detail below.

Variational quantum algorithms are hybrid quantum computing models that use a quantum processor to execute a program that approximately models the quantum behavior of a physical system. The program is designed so that its operation can be tuned through adjustments of run-time parameters of the quantum program. The program is run repeatedly from initial states where correct values are known, and a classical optimization technique is used to find quantum program parameters that create the most accurate simulation. Once those parameters have been established, the simulation can be used across a wide range of initial states.

To implement the VQA, the hybrid computer 100 receives a data input 106. The data input 106 includes a cost function C that encodes a solution to the computational task and an ansatz. The ansatz is a quantum operation that depends on a set of continuous or discrete parameters $\theta$ that can be adjusted, e.g., optimized (for this reason the ansatz is also referred to herein as a parameterized ansatz). An ansatz can capable of expressing a wide range of functions or systems, depending on the parameters applied, but should at least have a general form that is capable of describing the target function or system. A given ansatz can be capable of adapting to multiple useful functions or systems by using different values of the ansatz parameters. Further, multiple distinct ansatzes can each be capable of learning or adapting to a same useful function.

Values of the ansatz parameters θ are trained in a hybrid quantum-classical loop 108 to solve an optimization task given by Eq. (1) below.

$$\theta^* = \underset{\theta}{\operatorname{argmin}} C(\theta). \tag{1}$$

In other words, the goal of the optimization task is to find a set of parameters, θ*, that minimize (or minimize to within a threshold value) the cost function C. Each optimization step can require a potentially large number of evaluation runs on the quantum processor to sample the corresponding function output. A good ansatz can be defined as an ansatz that tunes rapidly, requiring fewer optimization steps to arrive at an acceptable computation of the target function. A bad ansatz can be defined as an ansatz that requires more optimization steps, or, worse, never converges on a good parameter set for the target function. An ansatz can be created specifically for a given target function by a knowledgeable quantum programmer, selected from a collection of ansatzes known to be useful for different classes of problems, or generated algorithmically.

The hybrid computer 100 iteratively processes the data input 106 to generate a data output 110. The data output 110 is an estimate of the solution to the computational task, where the form of the output depends on the computational task. In some implementations the data output 110 can be a quantum state, a probability distribution, bit string, gate sequence, or quantum operator.

At each iteration of the VQA, the hybrid computer 100 uses the quantum processor 102 to sample probability distributions that can be used by the classical processor 104 to estimate a value of the cost function C(θ) (or its gradient) for the iteration. The quantum processor 102 generates a quantum program sequence 112 to estimate the cost function for the iteration using values of the ansatz parameters for the current iteration, e.g., initial values as specified by the input 106 or adjusted values from a previous iteration. The quantum processor 102 executes the quantum program sequence 112 on a system of qubits, e.g., a qubit array 114, to evolve a quantum state of the system of qubits from an initial state to an evolved state. The evolved states are measured and sampled 116 to obtain a result of the quantum program. The quantum program sequence 112, qubit array 114, and processing element used to sample 116 the evolved states are referred to collectively herein as a quantum processing element.

At each iteration of the VQA, the hybrid computer 100 uses the classical processor 104 to evaluate 118 the probability distributions sampled by the quantum processor 102 and estimate a value of the cost function (or its gradient) for the iteration. The classical processor 104 then adjusts, e.g., optimizes 120, values of the parameters θ using classical optimization techniques to solve, or approximately solve, the computational task, e.g., solve Eq. (1). The adjusted values of the parameters θ form a new specification for the ansatz for a subsequent iteration of the hybrid loop 108. Once a termination condition is met, the hybrid computer 100 outputs an estimate of the solution to the computational task.

VQAs have been developed for a wide range of applications including simulating, e.g., determining a ground state of, molecules, simulating dynamics of quantum systems, and solving linear systems of equations. However, some simulations that have been successful to date include simulations of molecules that could plausibly have been more cost effectively simulated on a high performance computing cluster of classical computers. If computer architectures of incrementally better quality can be designed to operate using larger numbers of qubits, e.g., at the scale of ~500 qubits, there are technical problems in materials science and medicine that may prove tractable for the first time. The hybrid computer architecture described in this specification provides an efficient implementation architecture for computer systems built for these applications.

Comparative evaluation of quantum processors is nontrivial, but key performance metrics can include the number of physical qubits included in the quantum processor, the coherence time (T1) during which a qubit can maintain a controlled quantum state, the time required to implement individual rotation and entangling operations on qubits, the fidelity of these operations, and the time required to measure the binary state of a qubit.

A representative state of the art superconducting quantum processor may have a two-qubit gate delay of 32 nanoseconds, a measurement time of 4000 nanoseconds, and a coherence time of 15000 nanoseconds. If these were the only relevant performance metrics, it could be estimated that a program of at most 340 steps could be executed. However, the practical number of steps may be lower, e.g., due to the effects of limited fidelity and the fact that not all qubit operations in a given computational step can be safely performed at the same time on a given machine.

On the classical side of the hybrid computer system, the amount of compute work required to perform the optimizations varies considerably with the number of parameters being varied and the complexity of the computational task, e.g., the behavior being learned. For example, in the 15000 nanoseconds of quantum coherence time on a superconducting quantum processor, a single classical processor core could execute over 50,000 instructions—and aggressive classical CPUs have 10 s of cores.

Since quantum processing elements are expected to improve to bring economically interesting problems into the scope of variational quantum models, the use of parallel classical processing and parallel quantum processing—the use of parallel quantum processors to attack a given problem—will become an important factor in the adoption of quantum processing.

The very nature of quantum processing is statistical. The execution of a quantum program creates a complex, entangled set of quantum states whose sampled probability distributions are the program result. Each run-and-sample is completely independent. To generate results more quickly, for any purpose, multiple quantum processors can be given the same program sequence to initialize and evolve, and the only difference between two sequential runs on the same machine and two concurrent runs on two machines would be defects in the manufacture or calibration of the devices. So once a trained set of parameters for the model has been determined, the set of parameters can be dispatched to multiple parallel quantum processors and could be expected to show a linear speedup.

The training phase of variational quantum can likewise be accelerated. An algorithm can be selected to determine when a local optimum becomes a new global best guess. Depending on the optimization process used, improvements learned simultaneously on two different devices running two different parameter sets can interact with one another in ways that decrease the number of total iterations required for convergence.

Figure 2:
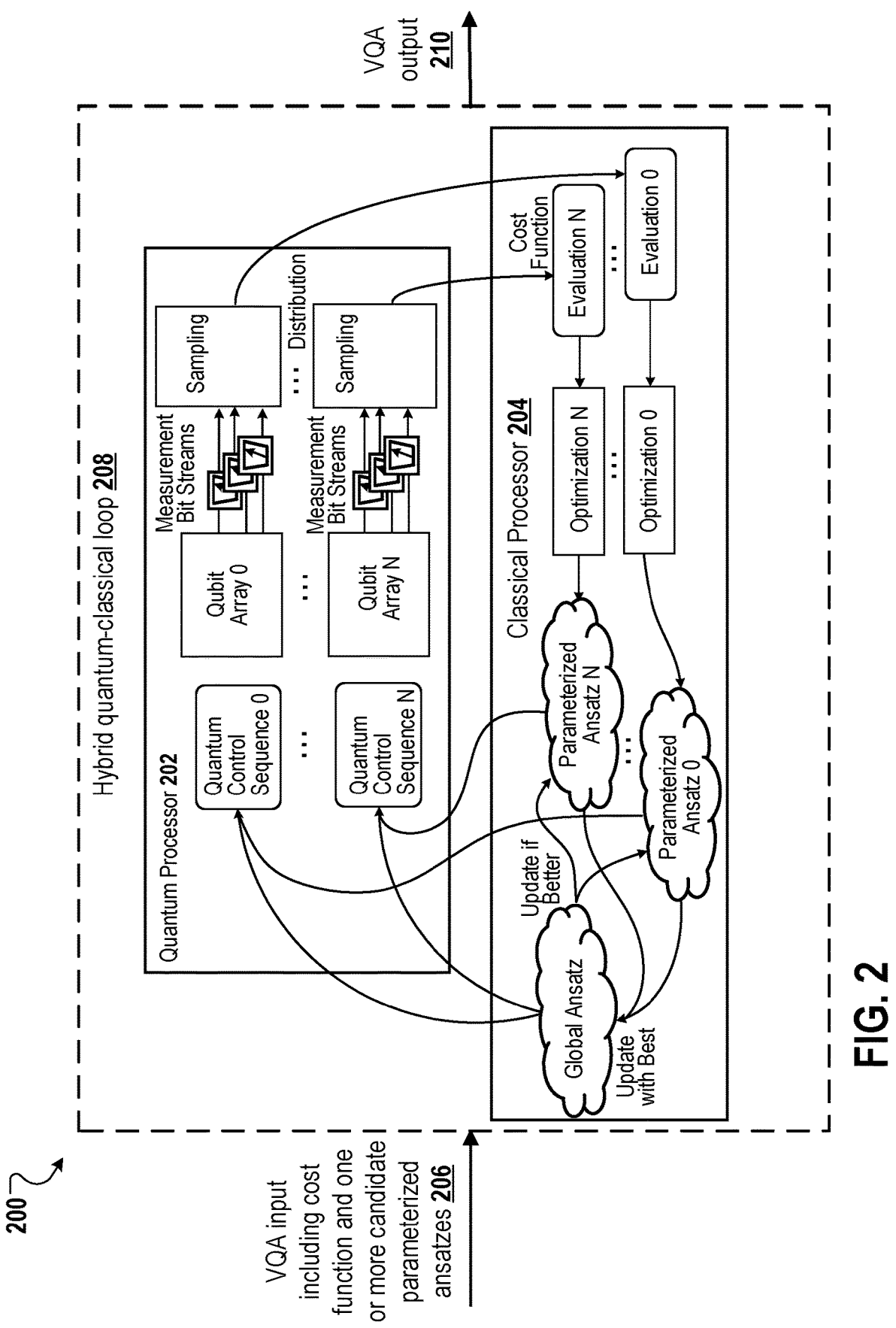
FIG. 2 is a schematic diagram of an example hybrid computer with multiple quantum processing units implementing a variational quantum algorithm to solve a computational task.

FIG. 2 is a schematic diagram of an example hybrid computer 200 implementing a VQA to solve a computational task. The hybrid computer 200 includes a quantum processor 202 in data communication with a classical processor 204. In this example, the quantum processor 202 includes multiple quantum processing units.

To implement the VQA, the hybrid computer 200 receives a data input 206. As described above with reference to FIG. 1, the data input 206 includes a cost function C that encodes a solution to a computational task. However, in this example, the data input 206 can also include one or more candidate ansatzes, i.e., one or more distinct ansatzes. Values of parameters of the one or more candidate ansatzes are trained in a hybrid quantum-classical loop 208 to obtain a solution to the optimization task given by Eq. (1). The hybrid computer 100 iteratively processes the data input 206 to generate a data output 210. The data output 210 is an estimate of the solution to the computational task, where the form of the output depends on the computational task.

At each iteration of the VQA, the hybrid computer 200 uses the quantum processor 202 to sample probability distributions that can be used by the classical processor 204 to estimate a value of the cost function $C(\theta)$ (or its gradient) for the iteration. However, in this example, the quantum processor 202 includes multiple quantum processing units, i.e., N+1 quantum processing units, where each quantum processing unit executes a respective quantum program sequence, includes a respective qubit array, and samples respective measured evolved quantum states.

In implementations where the data input 206 includes one candidate ansatz, each quantum processing unit can correspond to (e.g., perform computations or operations for) a respective optimization of values of the parameters of the candidate ansatz.

In implementations where the data input 206 includes multiple candidate ansatzes, each quantum processing unit can correspond to a respective candidate ansatz. That is, each quantum processing unit can use current values of parameters of a respective candidate ansatz to generate/execute the quantum program to generate a quantum program result. For example, in the example shown in FIG. 2, the data input 206 specifies N+1 candidate ansatzes, where quantum processing unit 0 is configured to estimate the cost function for an iteration using current values of parameters for candidate ansatz 0, quantum processing unit 1 is configured to estimate the cost function for an iteration using current values of parameters for candidate ansatz 1, etc.

Alternatively, in implementations where the data input 206 includes multiple candidate ansatzes, a subset of the multiple quantum processing units can correspond to a same respective candidate ansatz, where each quantum processing unit in the subset can correspond to a respective optimization of values of the parameters of the respective candidate ansatz.

In any of the implementations described above, the multiple quantum processing units can be configured to evaluate the cost function using the one or more candidate ansatzes in parallel.

At each iteration of the VQA, the hybrid computer 200 uses the classical processor 204 to evaluate the probability distributions sampled by the quantum processor 202 and estimate values of the cost function for the iteration. For example, in the example shown in FIG. 2, the classical processor 204 evaluates the probability distributions corresponding to each of the N+1 candidate parameterized ansatzes and estimates values of the cost function for the iteration for each candidate parameterized ansatz, e.g., using respective classical processing cores included in the classical processor.

The classical processor 204 can then adjust values of parameters of each of the one or more candidate parameterized ansatzes using classical optimization techniques to solve the computational task, e.g., using the respective classical processing cores. The classical processing cores can operate with a level of parallelism that is higher, lower, or equivalent to a level of parallelism at which the quantum processing units operate.

In the example shown in FIG. 2, the classical processor 204 is further configured to identify optimal updated values of parameters of the one or more candidate ansatzes, e.g., values of parameters of candidate ansatzes that best optimize the cost function or that are most likely to satisfy predetermined termination criteria, as described below with reference to FIG. 6. If the optimal updated parameter values do not satisfy predefined termination criteria, a subsequent iteration of the hybrid quantum-classical loop 208 can be performed using the updated values of the parameters of the one or more candidate ansatzes as the starting point. In some implementations the optimal updated parameter values can be used to further adjust the updated values of the parameters of the one or more candidate ansatzes before the subsequent iteration is performed.

If the optimal updated parameter values satisfies the predefined termination criteria, the hybrid computer 200 can output the parameters values as trained variational ansatz parameters. In some implementations the hybrid computer 200 can generate and output a solution to the computational task using the optimal updated parameter values. For example, the classical processor 204 can provide each of the multiple quantum processing units with the trained variational ansatz parameters so that the multiple quantum processing units can perform, in parallel, a quantum simulation or computation using the trained variational ansatz parameters. The classical processor 204 can process results of the performed quantum simulations or computations to obtain a quantum simulation or computation output.

The use of multiple quantum processing units to solve a single computational task can allow for some economies and simplifications of subsystems and procedures. For example, the volume of data that needs to be exchanged between the classical and quantum processing complexes is relatively small—a 500 qubit device would deliver 500 bits per measurement, and at the operation rates under discussion, that comes out to the order of 100 Gb/s of output per processor, within the realm of off-the-shelf serial networking technology.

The classical processing can be implemented with a higher, lower, or equivalent level of parallelism than the quantum processing. The mapping between the quantum processor output streams and classical processing cores or threads is arbitrary and can be dynamic, so long as the mapping between a specific ansatz parameter set and a specific output weight is clear. In some implementations the system can be operated so that the load is balanced, and both quantum and classical components in the pipeline are kept busy.

On the software side, quantum programming languages need a concept of multiple, distinct quantum processors. In most quantum languages, access to qubits on which to operate is requested and although it is possible to submit requests about topologies and processor classes, there is no notion of multiple physical instantiation spaces as a "name space" within which qubits operate. In some implementations an extension to the Cirq quantum framework can be implemented, where optional arguments are added to extend the qubit instantiation specifications, so that Gridqubs=cirq.GridQubit(x, y) is extended to Gridqubs[a] =cirq.GridQubit(x, y, qpu=a) which allocates a qubit grid on physical qubit grid "a", rather than a default.

The foregoing describes a hybrid computer architecture that uses a mapping between the quantum processor output streams and classical processing cores or threads to accelerate and optimize a VQA around one or more specific parametric ansatzes. The use of multiple stateful and competitive parallel exploration/optimization pipelines not only provides an opportunity for a faster discovery of an acceptably optimal solution, but also provides new mechanisms for qualitative improvement of the ansatz themselves.

However, the hybrid computer architecture can also be applied to other algorithms or simulations. For example, the hybrid computer architecture can be used to replace a classical algorithm with a quantum algorithm in a quantum Monte Carlo (QMC) computation. Most performant classical algorithms trade speed for systematic error. This error can be mitigated by checking against a trial wavefunction simulation that is imprecise but not susceptible to the systematic error. While some current quantum computers may not have the capacity to perform full simulations of non-trivial molecules, they do have the capacity to run very accurate quantum trial wavefunction models which, when fed back into the classical processor, results in more accurate overall results and greater theoretical scalability.

Figure 3:
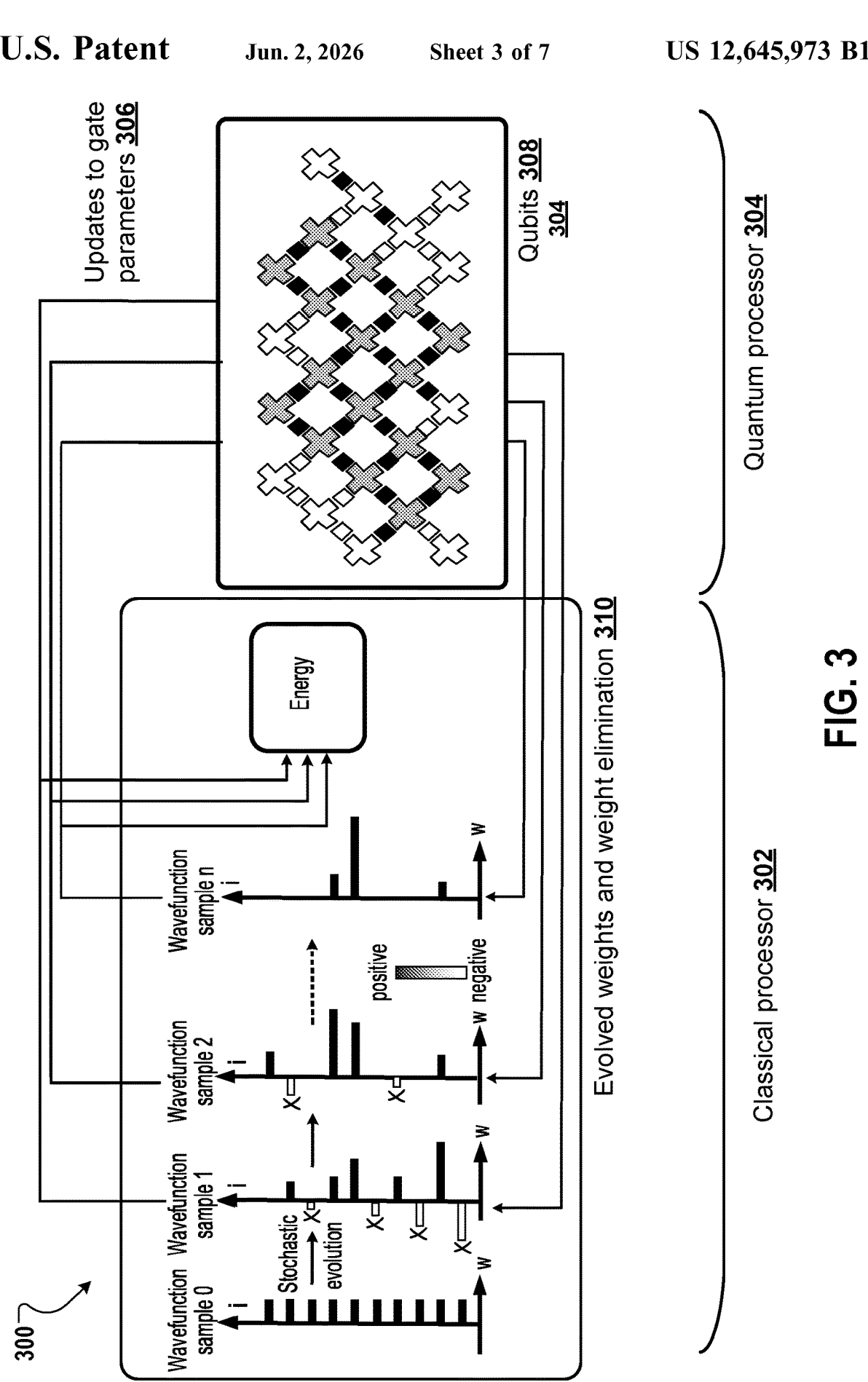
FIG. 3 is a schematic diagram of an example quantum-classical hybrid quantum Monte Carlo algorithm.

FIG. 3 is a schematic diagram of an example quantum-classical hybrid QMC algorithm. QMC approaches target an exact quantum state $|\Psi_0\rangle$, e.g., a ground state, of a many-body Hamiltonian $\hat{H}$ via imaginary time evolution of an initial wavefunction $|\Phi_0\rangle$ that has a non-zero overlap with $|\Psi_0\rangle$, e.g., $$|\Psi_0\rangle \propto \lim_{\tau\to\infty} |\Psi(\tau)\rangle, |\Psi(\tau)\rangle \equiv \exp\{(-\tau\hat{H})\}|\Phi_0\rangle,$$

where $\tau$ represents imaginary time and $|\Psi(\tau)\rangle$ represents the time-evolved wavefunction from $|\Phi_0\rangle$ by t. Without any further modification, this is an exact approach to the computation of the target state $|\Psi_0\rangle$. In practice, a deterministic implementation this time evolution scales exponentially with system size. Therefore, conventional techniques resort to a stochastic realization of the time evolution for scalable simulations. The ground state energy of the target state, $E_{ground}=E(\tau=\infty)$, can be estimated by averaging a time series of $\{\langle E(\tau)\rangle\}$, given by a weighted average over M statistical samples $$\langle E(\tau)\rangle = \sum_{i=1}^{M} w_i(\tau)E^{(i)}(\tau), \text{ where } E^{(i)}(\tau)$$

represents the i-th statistical sample for the energy and $w_i(\tau)$ represents the corresponding normalized weight for that sample at imaginary time $\tau$.

During the implementation of the quantum-classical hybrid QMC algorithm, a classical processor 302 iteratively evolves multiple wavefunction samples 0, 1, 2, . . . n in (imaginary) time, where each wavefunction sample has associated weights w. The classical processor 302 provides the wavefunction samples to the quantum processor 304. The quantum processor 304 computes overlap values between a quantum trial wavefunction and the wavefunction samples, whilst updating gate parameters 306 that describe the wavefunctions. The quantum processor 304 can use a system of qubits 308 to efficiently estimate the overlap, which is then used to evolve the associated weights and to discard stochastic wavefunction samples with weights that are less than zero. The evolved weights and weight eliminations 310 (referred to herein as corrections) are provided back to the classical processor 302 for a subsequent iteration.

During each iteration, observables such as energy can be computed by the classical processor 302 using the overlaps computed by the quantum processor 304.

Figure 4:
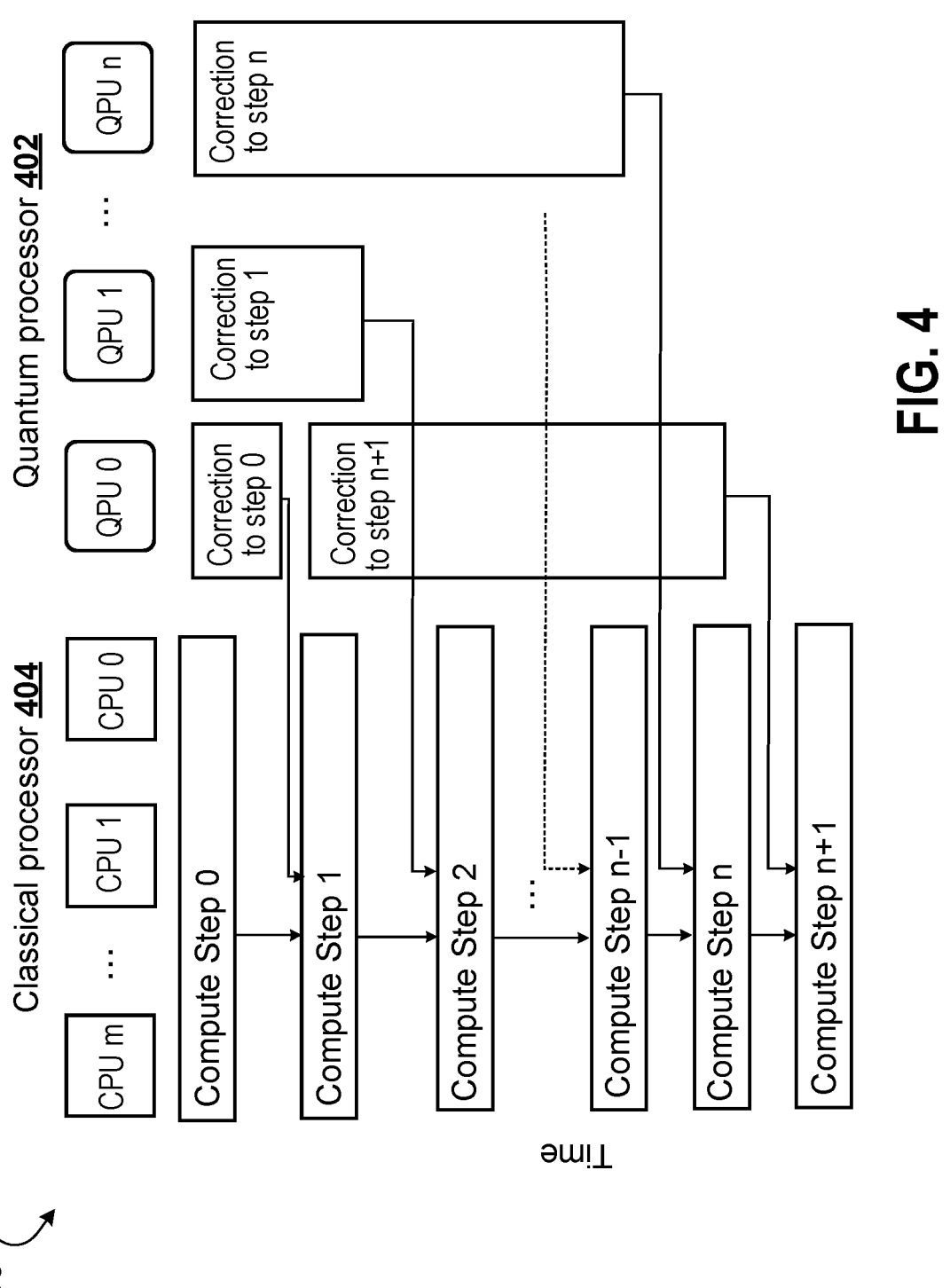
FIG. 4 is a schematic diagram of an example hybrid computer implementing a hybrid quantum Monte Carlo algorithm.

FIG. 4 is a schematic diagram of an example hybrid computer 400 implementing a QMC algorithm. The hybrid computer 400 includes a quantum processor 402 in data communication with a classical processor 404. In this example, the quantum processor 402 includes multiple quantum processing units QPU 0, QPU 1, . . . , QPU n. The classical processor 404 includes multiple classical processing units CPU 0, CPU 1, . . . , CPU m.

The classical processor 404 uses the multiple classical processing units to perform an initial step 406 of the QMC algorithm, e.g., evolve multiple initial wavefunctions where each initial wavefunction has a set of associated weights. The classical processor 404 provides samples of the evolved wavefunctions to the quantum processor 402. A first quantum processing unit uses the samples of the evolved wavefunctions to compute corrections to the initial step and provides the corrections to the classical processor 404. The classical processor 404 computes a subsequent step of the QMC algorithm using the corrections. The process is iterated until a final, n+1-th step of the QMC algorithm is performed by the classical processor. As shown, the number of quantum processing units can be less than the number of QMC steps.

As with the VQA application described above with reference to FIGS. 1 and 2, the volume of data passing between the quantum processing units and the classical processor is small. In addition, the statistical nature of the quantum processing means that there is no requirement for all of the quantum computations to be performed on a single, stateful, quantum processor. The quantum correction terms fed to each stage of the classical computation could be obtained from separate quantum processors.

Further, the correction terms for iteration i of the Monte Carlo computation do not depend on results of iteration i−1. With an appropriately architected parallel hybrid system, the operations can be pipelined across N quantum processing units and M classical processing units so as to keep all of the processing units busy and produce results as efficiently as the volume of processing power allows.

Figure 5:
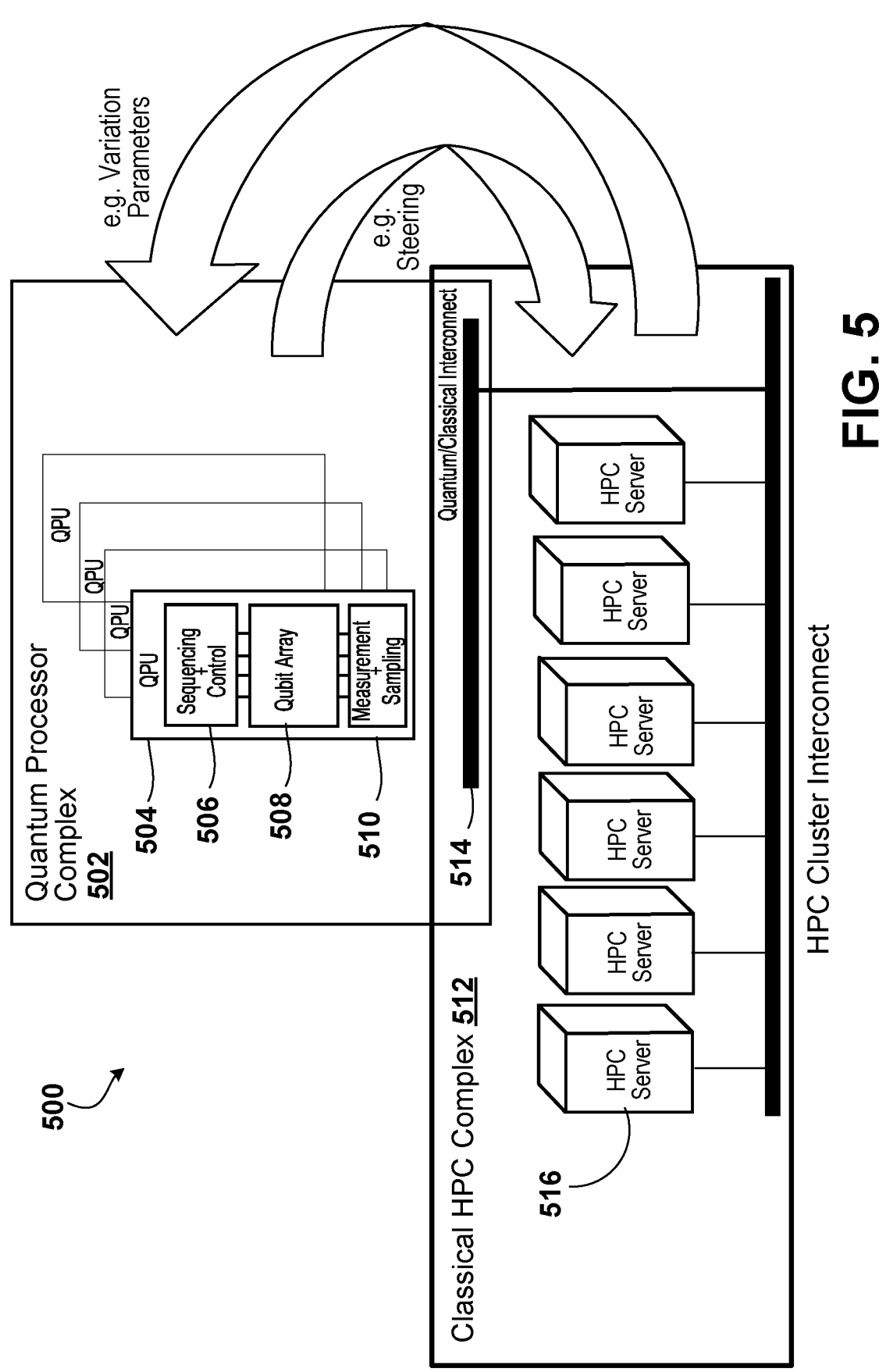
FIG. 5 is a block diagram of an example hybrid computer architecture.

FIG. 5 is a block diagram of an example hybrid computer architecture 500. The system 500 is an example of a system implemented as quantum and classical computer programs on quantum computing devices and classical computers in one or more locations, in which the systems, components, and techniques described herein can be implemented.

The example hybrid computer architecture 500 includes a quantum processor complex 502 that is configured to perform quantum computations. The quantum processor complex 502 includes multiple quantum processing units (QPUs), e.g., quantum processing unit 504. Each quantum processing unit includes components for sequencing and control 506, e.g., a module that is configured to generate quantum operation sequences, components for performing quantum computations, e.g., a qubit array 508 and control devices configured to operate qubits in the qubit array, and components for measuring and sampling evolved qubit states 510.

The quantum processor complex 502 communicates with a classical high performance computing (HPC) complex 512 through a quantum-classical interconnect 514. The classical high performance computing complex 512 includes multiple high performance computing servers, e.g., server 516.

Figure 6:
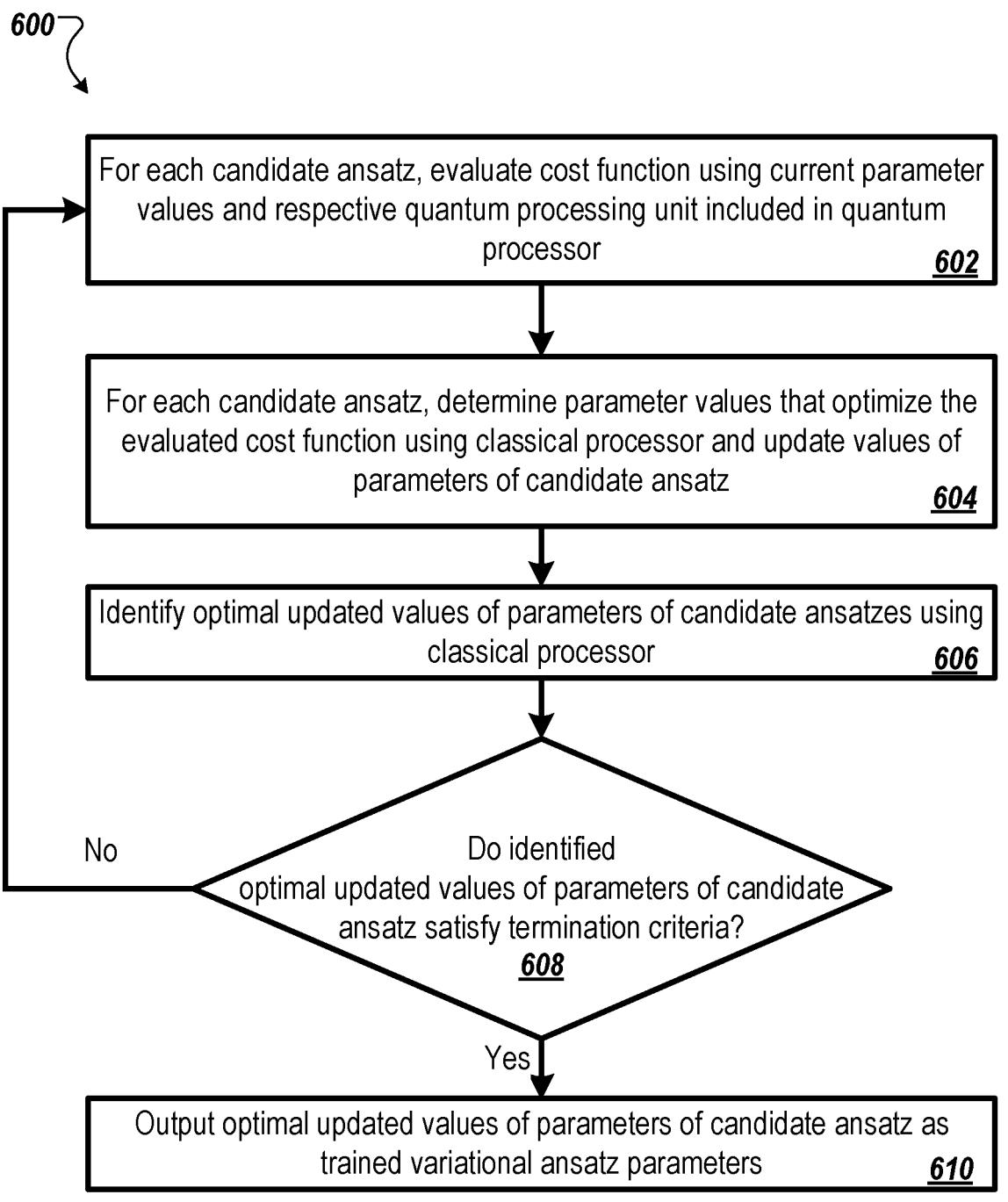
FIG. 6 is a flowchart of an example process for variational ansatz exploration.

FIG. 6 is a flowchart of an example process 600 for variational ansatz exploration. One or more candidate variational ansatzes are optimized and evaluated to obtain trained parameters of one or more of the candidate variational ansatzes, e.g., a best candidate variational ansatz. The candidate variational ansatzes can represent a parameterized quantum operation or parameterized quantum circuit. For convenience, the process 600 will be described as being performed by components of a hybrid computer architecture that includes a classical processor and quantum processor. For example, the hybrid computer architecture shown in FIG. 2 or FIG. 5, appropriately programmed, can perform example process 600.

For each of one or more candidate ansatzes, respective quantum processing units included in a quantum processor of the hybrid computer architecture evaluate a cost function using respective values of parameters of the candidate ansatz (step 602). The quantum processing units of the quantum processor can evaluate the cost function using the respective values of parameters of the one or more candidate ansatzes in parallel.

The quantum processor provides the evaluated cost functions (and data indicating which candidate ansatz and/or which parameter values were used to evaluate the cost function) to a classical processor included in the hybrid computer architecture. For each candidate ansatz and each set of values of parameters of the candidate ansatz, the classical processor uses one or more classical processing cores to determine candidate ansatz parameter values that optimize the respective evaluated cost function and update the values of the parameters of the candidate ansatz using the determined parameter values (step 604).

The classical processing cores can operate with a level of parallelism that is higher, lower, or equivalent to a level of parallelism at which the quantum processing units operate. For example, the classical processor can use a same number of classical processing cores to determine optimized candidate ansatz parameter values and update the values of the parameters of the candidate ansatzes, e.g., where each quantum processing unit is mapped to a respective classical processing core. As another example, the classical processor can use a number of classical processing cores that is less than the number of quantum processing units used to determine optimized candidate ansatz parameter values and update the values of the parameters of the candidate ansatzes, e.g., one classical processing core receives evaluated cost functions from multiple quantum processing units. In this case, the mapping between the quantum processing units and classical processing cores can be arbitrary and can be dynamic, e.g., to balance the load such that the quantum processing units and classical processing cores are kept busy.

The classical processor then identifies one or more optimal updated values of parameters of the one or more candidate ansatzes (step 606). For example, the classical processor can identify values of parameters of candidate ansatzes that best optimize the cost function. As another example, the classical processor can identify values of parameters of candidate ansatzes that are most likely to satisfy predetermined termination criteria in a least number of subsequent optimization steps, i.e., identify parameter optimizations of candidate ansatzes that are "on the right track". In these example, the classical processor can use results of previous iterations to identify the optimal parameter values. For example, the classical processor can maintain a database that stores a history of parameter space exploration, e.g., information about relative performance between different ansatzes (e.g., how many optimization steps were required to achieve convergence and which initial parameters were used for the optimization). The classical processor can use this information to identify more and less promising parameter sub-spaces and to prioritize resources accordingly.

The classical processor determines whether the identified optimal updated values of the parameters of the candidate ansatzes satisfies termination criteria, e.g., produces a value of the cost function that converges or is within a predetermined acceptable threshold (step 608).

In response to determining that the identified optimal updated values of the parameters of the candidate ansatzes do not satisfy the termination criteria, the hybrid computer architecture performs another iteration of steps 602-608. In response to determining that the identified optimal updated values of the parameters of the candidate ansatzes do satisfy the termination criteria, the classical processor outputs the optimal updated values of the parameters of the candidate ansatz (and, if necessary, data specifying which of the one or more candidate ansatzes the parameters correspond to) as trained variational ansatz parameters (step 610).

The quantum processor can use the trained variational ansatz parameters to perform a quantum simulation. For example, after determining that the identified optimal updated values of the parameters of the candidate ansatzes do satisfy the termination criteria, the classical processor can provide each of the multiple quantum processing units with the trained ansatz parameters. Each of the multiple quantum processing units can then, in parallel, perform a quantum simulation using the trained ansatz parameters. Results of the performed quantum simulations can be post-processed, e.g., by the classical processor, to obtain an output of the quantum simulation.

Figure 7:
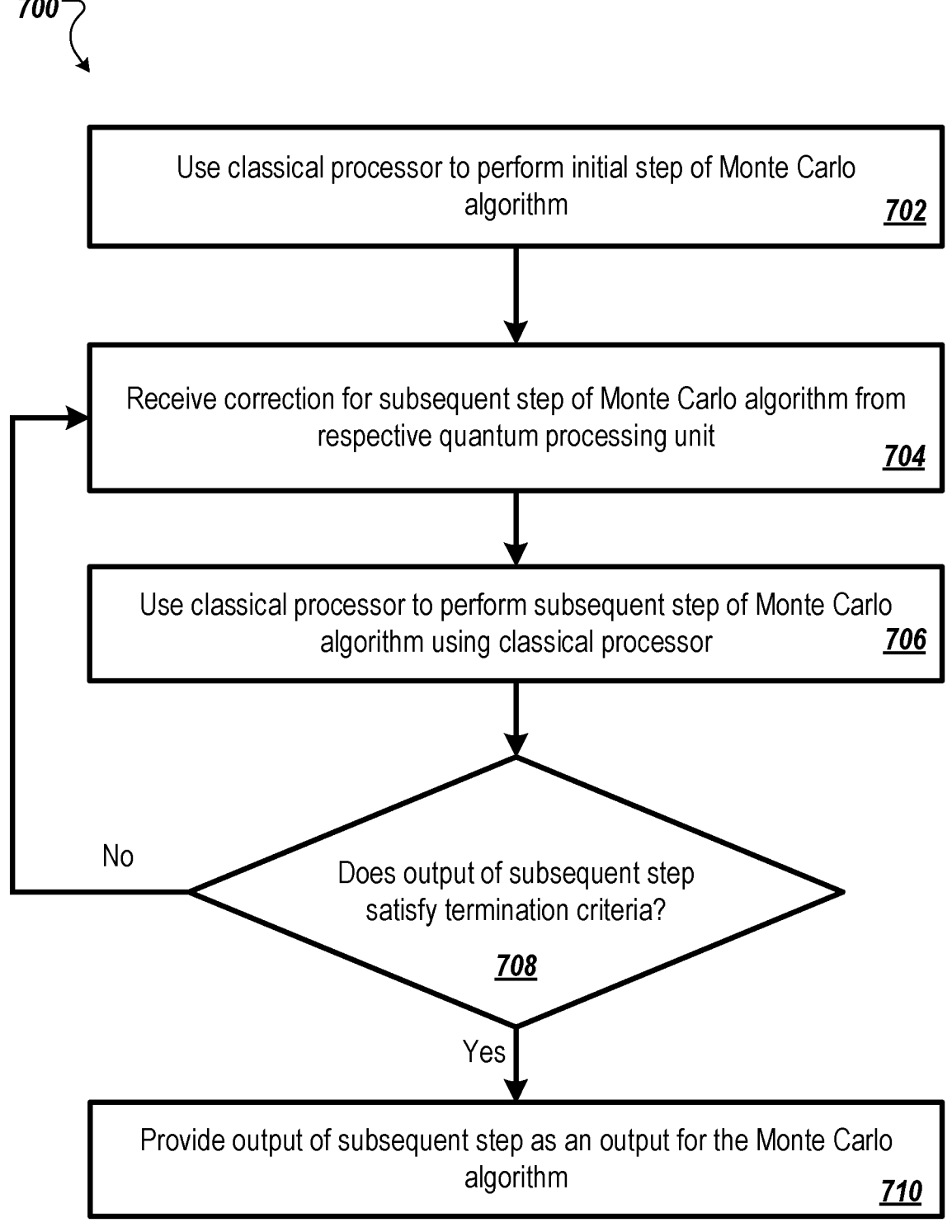
FIG. 7 is a flowchart of an example process for performing a hybrid quantum Monte Carlo algorithm.

FIG. 7 is a flowchart of an example process 700 for performing a hybrid Monte Carlo algorithm. Quantum processors can replace classical processers by computing the correction terms. The quantum computed correction terms fed to each stage of the classical computation can come from a separate quantum processor. Furthermore, the correction terms for iteration i do not depend on results of iteration i−1. With a suitably architected parallel system, the operations can be pipelined across N quantum processors and M classical processors such as to keep them all busy and produce results as efficiently as the volume of processing power allows.

For convenience, the process 700 will be described as being performed by components of a hybrid computer architecture that includes a classical processor and quantum processor. For example, the hybrid computer architecture shown in FIG. 4 or FIG. 5, appropriately programmed, can perform example process 700.

The classical processor performs an initial step of the Monte Carlo algorithm (step 702). The classical processor then iteratively performs subsequent steps of the Monte Carlo algorithm until termination criteria are met. At each iteration, the classical processor receives, from a respective quantum processing unit included in a quantum processor including multiple quantum processing units, a correction for the iteration (step 704). In some implementations the multiple quantum processing units can include a number of quantum processing units that is less than the number of steps of the Monte Carlo algorithm. In these implementations a mapping between the quantum processing units and the steps of the Monte Carlo algorithm for which the quantum processing units compute corrections can be dynamic to balance a load of the quantum processor and the classical processor.

The classical processor performs the corresponding step of the Monte Carlo algorithm using the received correction (step 706). At the end of the iteration, the classical processor determines whether an output of the performed subsequent step satisfies the termination criteria (step 708). In response to determining that the output does not satisfy the termination criteria, a subsequent iteration is performed. In response to determining that the output does satisfy the termination criteria, the classical processor provides the output of the iteration as an output for the Monte Carlo algorithm (step 710).

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable computers, operating with one or more processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more computers to be "configured to" perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For example, a quantum computer may receive instructions from a digital computer that, when executed by the quantum computing apparatus, cause the apparatus to perform the operations or actions.

Computers suitable for the execution of a computer program can be based on general or special purpose processors, or any other kind of central processing unit. Generally, a central processing unit will receive instructions and data from a read-only memory, a random access memory, or quantum systems suitable for transmitting quantum data, e.g. photons, or combinations thereof.

The elements of a computer include a central processing unit for performing or executing instructions and one or more memory devices for storing instructions and digital, analog, and/or quantum data. The central processing unit and the memory can be supplemented by, or incorporated in, special purpose logic circuitry or quantum simulators. Generally, a computer will also include, or be operatively coupled to receive data from or transfer data to, or both, one or more mass storage devices for storing data, e.g., magnetic, magneto-optical disks, optical disks, or quantum systems suitable for storing quantum information. However, a computer need not have such devices.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

Computer-readable media suitable for storing computer program instructions and data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or system that may include one or more processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for variational ansatz exploration, the method comprising:
iteratively, until termination criteria are met:
for each of one or more candidate ansatzes:
evaluating, by a respective quantum processing unit included in a quantum processor, a cost function using current values of parameters of the candidate ansatz, wherein one or more quantum processing units of the quantum processor evaluate the cost function in parallel,
determining, by a classical processor, parameter values of the candidate ansatz that optimize the evaluated cost function, and
updating, by the classical processor, the values of the parameters of the candidate ansatz using the determined parameter values;
identifying, by the classical processor and from the updated values of the parameters of the one or more candidate ansatzes, one or more optimal updated values of the parameters of the candidate ansatzes; and
determining, by the classical processor, whether the optimal updated values of the parameters of the candidate ansatz satisfies the termination criteria; and
in response to determining that the optimal updated values of the parameters of the candidate ansatz satisfies termination criteria, outputting, by the classical processor, the optimal updated values of the parameters of the candidate ansatz as trained variational ansatz parameters, wherein outputting the optimal updated values of the parameters of the candidate ansatz as trained variational ansatz parameters comprises:
providing, by the classical processor, each of the multiple quantum processing units with the trained variational ansatz parameters;
performing, in parallel and by each of the multiple quantum processing units, a quantum simulation using the trained variational ansatz parameters; and
processing, by the classical processor, results of the performed quantum simulations to obtain a quantum simulation output.

2. The method of claim 1, wherein the one or more candidate ansatzes comprise one or more distinct ansatzes.

3. The method of claim 1, wherein the classical processor comprises multiple classical processing cores, each of the classical processing cores configured to determine parameter values of a candidate ansatz that optimize an evaluated cost function and update the values of the parameters of the candidate ansatz using the determined parameter values, wherein the classical processing cores operate with a level of parallelism that is higher, lower, or equivalent to a level of parallelism at which the quantum processing units operate.

4. The method of claim 3, wherein a mapping between cost functions evaluated by the quantum processing units and the classical processing cores is dynamic to balance a load of the quantum processor and the classical processor.

5. The method of claim 1, further comprising using the quantum processor and trained variational ansatz parameters to perform a quantum simulation.

6. The method of claim 1, wherein the one or more candidate ansatzes comprise a parameterized quantum operation or parameterized quantum circuit.

7. The method of claim 1, wherein identifying one or more optimal updated values of the parameters of the candidate ansatzes comprises using historical parameter space exploration data to identify suitable parameter subspaces.

8. A system comprising:
a quantum processor comprising multiple quantum processing units;
a classical processor in data communication with the quantum processor, the classical processor comprising one or more classical processing cores;
wherein the system is configured to perform operations comprising: iteratively, until termination criteria are met:
for each of one or more candidate ansatzes:
evaluating, by a respective quantum processing unit included in a quantum processor, a cost function using current values of parameters of the candidate ansatz, wherein one or more quantum processing units of the quantum processor evaluate the cost function in parallel,
determining, by a classical processor, parameter values of the candidate ansatz that optimize the evaluated cost function, and
updating, by the classical processor, the values of the parameters of the candidate ansatz using the determined parameter values;
identifying, by the classical processor and from the updated values of the parameters of the one or more candidate ansatzes, one or more optimal updated values of the parameters of the candidate ansatzes; and
determining, by the classical processor, whether the optimal updated values of the parameters of the candidate ansatz satisfies the termination criteria; and
in response to determining that the optimal updated values of the parameters of the candidate ansatz satisfies termination criteria, outputting, by the classical processor, the optimal updated values of the parameters of the candidate ansatz as trained variational ansatz parameters, wherein outputting the optimal updated values of the parameters of the candidate ansatz as trained variational ansatz parameters comprises:
providing, by the classical processor, each of the multiple quantum processing units with the trained variational ansatz parameters;

performing, in parallel and by each of the multiple quantum processing units, a quantum simulation using the trained variational ansatz parameters; and processing, by the classical processor, results of the performed quantum simulations to obtain a quantum simulation output.

9. The system of claim 8, wherein the one or more candidate ansatzes comprise one or more distinct ansatzes.

10. The system of claim 8, wherein the classical processor comprises multiple classical processing cores, each of the classical processing cores configured to determine parameter values of a candidate ansatz that optimize an evaluated cost function and update the values of the parameters of the candidate ansatz using the determined parameter values, wherein the classical processing cores operate with a level of parallelism that is higher, lower, or equivalent to a level of parallelism at which the quantum processing units operate.

11. The system of claim 10, wherein a mapping between cost functions evaluated by the quantum processing units and the classical processing cores is dynamic to balance a load of the quantum processor and the classical processor.

12. The system of claim 8, wherein the operations further comprise using the quantum processor and trained variational ansatz parameters to perform a quantum simulation.

13. The system of claim 8, wherein the one or more candidate ansatzes comprise a parameterized quantum operation or parameterized quantum circuit.

14. The system of claim 8, wherein identifying one or more optimal updated values of the parameters of the candidate ansatzes comprises using historical parameter space exploration data to identify suitable parameter subspaces.

15. A computer implemented method for performing a Monte Carlo algorithm, the method comprising:

performing, by a classical processor, an initial step of the Monte Carlo algorithm;

iteratively, until termination criteria are met:

performing, by the classical processor, a subsequent step of the Monte Carlo algorithm, comprising receiving, from a respective quantum processing unit included in a quantum processor comprising multiple quantum processing units, a correction for the subsequent step; and determining, by the classical processor, whether an output of the performed subsequent step satisfies the termination criteria; and in response to determining that the output of the performed subsequent step satisfies the termination criteria, providing, by the classical processor, the output of the performed subsequent step as an output for the Monte Carlo algorithm, wherein providing the output of the performed subsequent step as an output for the Monte Carlo algorithm comprises:

providing, by the classical processor, Monte Carlo state data associated with the subsequent step to each of the multiple quantum processing units;

performing, in parallel and by the multiple quantum processing units, quantum computations to determine correction terms for the Monte Carlo state data; and aggregating, by the classical processor, the correction terms received from the multiple quantum processing units to update the Monte Carlo state and obtain the output of the Monte Carlo algorithm.

16. The method of claim 15, wherein the multiple quantum processing units comprise a number of quantum processing units that is less than a number of steps of the Monte Carlo algorithm.

17. The method of claim 15, wherein a mapping between the quantum processing units and the steps of the Monte Carlo algorithm is dynamic to balance a load of the quantum processor and the classical processor.

18. A system comprising:

a quantum processor comprising multiple quantum processing units;

a classical processor in data communication with the quantum processor, the classical processor comprising one or more classical processing cores;

wherein the system is configured to perform operations comprising:

performing, by a classical processor, an initial step of a Monte Carlo algorithm; iteratively, until termination criteria are met:

performing, by the classical processor, a subsequent step of the Monte Carlo algorithm, comprising receiving, from a respective quantum processing unit included in a quantum processor comprising multiple quantum processing units, a correction for the subsequent step; and determining, by the classical processor, whether an output of the performed subsequent step satisfies the termination criteria; and in response to determining that the output of the performed subsequent step satisfies the termination criteria, providing, by the classical processor, the output of the performed subsequent step as an output for the Monte Carlo algorithm, wherein providing the output of the performed subsequent step as an output for the Monte Carlo algorithm comprises:

providing, by the classical processor, Monte Carlo state data associated with the subsequent step to each of the multiple quantum processing units;

performing, in parallel and by the multiple quantum processing units, quantum computations to determine correction terms for the Monte Carlo state data; and aggregating, by the classical processor, the correction terms received from the multiple quantum processing units to update the Monte Carlo state and obtain the output of the Monte Carlo algorithm.

* * * * *